US011916292B1

(12) United States Patent
Park et al.

(10) Patent No.: US 11,916,292 B1
(45) Date of Patent: Feb. 27, 2024

(54) ANTENNA APPARATUS

(71) Applicant: AGENCY FOR DEFENSE DEVELOPMENT, Daejeon (KR)

(72) Inventors: Byung Chul Park, Daejeon (KR); Kun Sup Kwon, Daejeon (KR); Jong Wan Heo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/104,953

(22) Filed: Feb. 2, 2023

(30) Foreign Application Priority Data

Aug. 17, 2022 (KR) ........................ 10-2022-0102870

(51) Int. Cl.
*H01Q 13/02* (2006.01)
*H01Q 13/18* (2006.01)
*H01P 3/123* (2006.01)

(52) U.S. Cl.
CPC ......... *H01Q 13/0275* (2013.01); *H01P 3/123* (2013.01); *H01Q 13/0225* (2013.01); *H01Q 13/18* (2013.01)

(58) Field of Classification Search
CPC ........... H01Q 13/0225; H01Q 13/0275; H01Q 13/18; H01P 3/123
See application file for complete search history.

(56) References Cited

U.S. PATENT DOCUMENTS 6,025,809 A 2/2000 Lane et al.
6,118,978 A 9/2000 Ihmels
6,320,554 B1 11/2001 Yuanzhu
2010/0033391 A1 2/2010 McLean
2010/0238086 A1 9/2010 Moon et al.
2011/0133863 A1 6/2011 Lange
2017/0170571 A1 6/2017 Ushijima et al.
2022/0029257 A1 1/2022 Menargues Gomez et al.
(Continued)

FOREIGN PATENT DOCUMENTS

CN 109509950 A 3/2019
CN 110600877 A 12/2019
CN 112886253 A 6/2021
(Continued)

OTHER PUBLICATIONS

O.A. Peverini et al., "Q-band polarizers for the LSPE-Strip correlation radiometric instrument", Journal of Instrumentation, vol. 17, No. 6, Jun. 30, 2022 (2022), 20 pages.
(Continued)

*Primary Examiner* — Hoang V Nguyen
*Assistant Examiner* — Amal Patel
(74) *Attorney, Agent, or Firm* — MILES & STOCKBRIDGE P.C.

(57) ABSTRACT

According to the present disclosure, an antenna apparatus which includes a hollow pillar shaped waveguide extending in a first direction and at least one ridge protruding from an inner circumferential surface of the waveguide and extending in the first direction, wherein the ridge has at least one recessed groove formed in the first direction; and an antenna apparatus which includes the waveguide, the ridge and the iris structure protruding from the inner circumferential surface of the waveguide along a plane intersecting the first direction, are provided.

13 Claims, 13 Drawing Sheets

(56) References Cited

U.S. PATENT DOCUMENTS

2022/0190477 A1* 6/2022 Girard ..................... H01P 3/123

FOREIGN PATENT DOCUMENTS

| | | | |
|---|---|---|---|
| JP | 63155802 | A | 6/1988 |
| JP | 6257401 | B2 | 1/2018 |
| KR | 20000052593 | A | 8/2000 |
| KR | 100311455 | B1 | 4/2002 |
| KR | 20050036595 | A | 4/2005 |
| KR | 100834422 | B1 | 6/2008 |
| KR | 20100019394 | A | 2/2010 |
| KR | 101427148 | B1 | 8/2014 |
| KR | 101483567 | B1 | 1/2015 |
| KR | 20210140767 | A | 11/2021 |

OTHER PUBLICATIONS

Search Report dated Aug. 11, 2023 in corresponding European Application No. 23155435.3.
Office Action with English translation dated Jul. 11, 2023 in corresponding Japanese Application No. 2023-013208.

* cited by examiner

ANTENNA APPARATUS

CROSS-REFERENCE TO RELATED APPLICATION(S)

This application claims the benefit of Korean Patent Application No. 10-2022-0102870, filed on Aug. 17, 2022, in the Korean Intellectual Property Office, the disclosure of which is incorporated herein by reference.

FIELD OF THE INVENTION

The present disclosure relates to an antenna apparatus.

DESCRIPTION OF THE RELATED ART

An antenna apparatus is an essential component for wireless communication capable of transmitting information in the form of electromagnetic waves having a specific frequency wirelessly. In particular, an antenna apparatus of a communication satellite such as a military satellite requires functions such as high gain and beam steering, and accordingly, it is essential to design an arrangement of an antenna apparatus mounted on the communication satellite. In addition, for beam steering of the array designed antenna apparatus, it is advantageous that the distance between the arrays of the antenna apparatus be less than half the wavelength of the transmitted electromagnetic wave, and accordingly, miniaturization of the antenna apparatus is required.

Meanwhile, when the ridge structure is applied in the waveguide of the antenna apparatus, it is suitable for miniaturization, but an impedance mismatch occurs due to the miniaturization. The impedance mismatch causes an electrical performance related to at least one of a voltage standing wave ratio (VSWR) and a return loss, and thus negatively affects the operation of the antenna apparatus. Accordingly, research is being actively conducted to solve the impedance mismatch while applying the ridge structure in the waveguide of the antenna apparatus.

SUMMARY OF THE INVENTION

Accordingly, the present disclosure is directed to antenna apparatus that substantially obviates one or more problems due to limitations and disadvantages of the related art. The present disclosure provides an antenna apparatus including a detailed structure for impedance matching.

According to the present disclosure, there is provided a solution to the impedance mismatch through at least one impedance matching structure applied together with the ridge, thereby providing a miniaturized array design antenna apparatus.

According to the present disclosure, there is further provided an antenna apparatus including a ridge and an impedance matching structure which is easily manufactured using an additive manufacturing method, which is a 3-dimensional (3D) printing method.

Additional features and advantages of the invention will be set forth in the description which follows, and in part will be apparent from the description, or may be learned by practice of the disclosure. The objectives and other advantages of the invention will be realized and attained by the structure particularly pointed out in the written description and claims hereof as well as the appended drawings To achieve these and other advantages and in accordance with the purpose of the present invention, as embodied and broadly described, an antenna apparatus according to the disclosed example embodiments includes a hollow pillar shaped waveguide extending in a first direction and at least one ridge protruding from an inner circumferential surface of the waveguide and extending in the first direction, wherein the ridge has at least one recessed groove formed in the first direction.

In another aspect, an antenna apparatus according to the disclosed example embodiments includes a hollow pillar shaped waveguide extending in a first direction, at least one ridge protruding from an inner circumferential surface of the waveguide and extending in the first direction, and an iris structure protruding from the inner circumferential surface of the waveguide along a plane intersecting the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the invention and together with the description serve to explain the principles of the invention.

DETAILED DESCRIPTION OF THE EXAMPLE EMBODIMENTS

Figure 1:
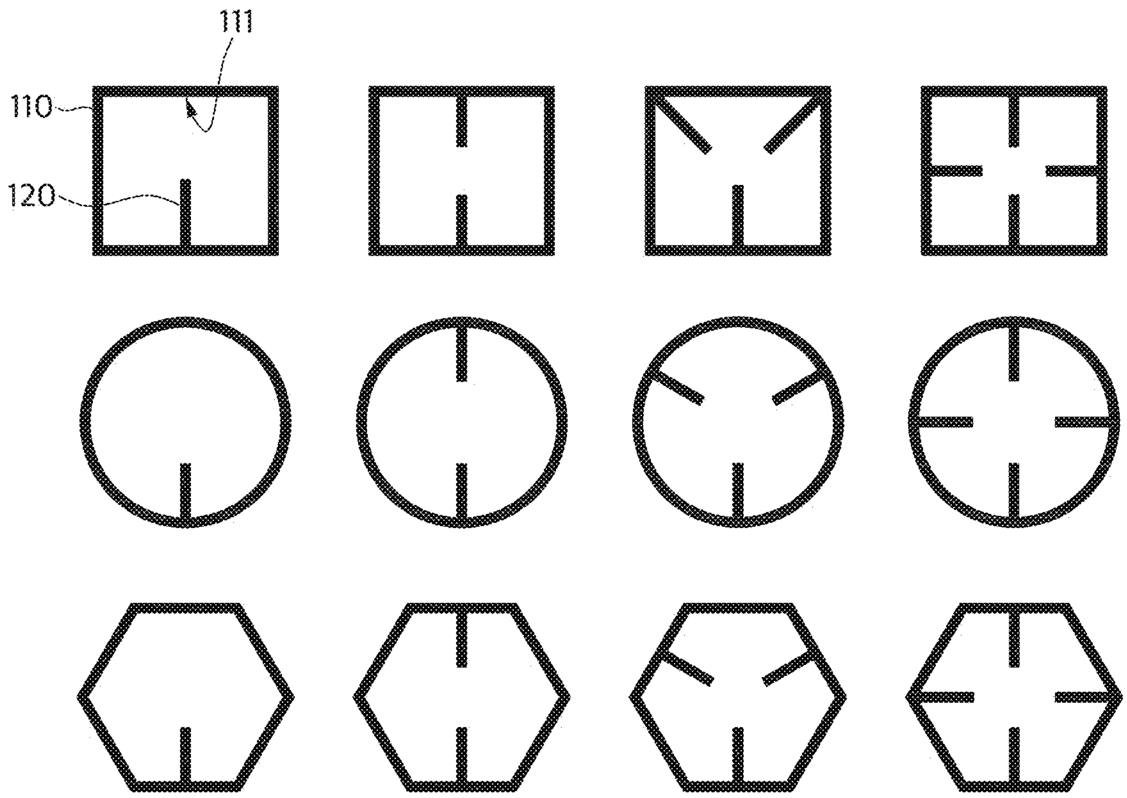
FIG. 1 is a conceptual diagram for explaining various types of waveguides of an antenna apparatus according to example embodiments of the present disclosure.

The terms used in the example embodiments are selected as currently widely used general terms as possible while considering the functions in the present disclosure, but may vary depending on the intention or precedent of a person skilled in the art, the emergence of new technology, and the like. In addition, in certain cases, there are also terms arbitrarily selected by the applicant, and in this case, the meaning will be described in detail in the corresponding description. Therefore, the terms used in the present disclosure should be defined based on the meaning of the term and the contents of the present disclosure, rather than the simple name of the term.

In the entire specification, when a part "includes" a certain component, it means that other components may be further included, rather than excluding other components, unless otherwise stated.

The expression "at least one of a, b, and c" described throughout the specification may cover 'a alone', 'b alone', 'c alone', 'a and b', 'a and c', 'b and c', or 'all a, b, and c'.

In describing the example embodiment, descriptions of technical contents that are well known in the technical field to which the present disclosure pertains and are not directly related to the present disclosure may be omitted. This is to more clearly convey the present disclosure. For the same reason, some components are exaggerated, omitted, or schematically illustrated in the accompanying drawings. In addition, the size of each component does not fully reflect the actual size. In each figure, the same or corresponding components are assigned the same reference numerals.

In this specification (especially in the claims), the use of the term of "the" and similar referential terms may be used in both the singular and the plural. In addition, when a range is described, individual values within the range are included (unless there is a description to the contrary), and each individual value constituting the range is described in the detailed description. Finally, the operations constituting a method may be performed in an appropriate order, unless the order is explicitly stated or there is no description to the contrary. It is not necessarily limited to the order of description or claim.

Advantages and features of the present disclosure, and a method for achieving them will become apparent with reference to the embodiments described below in detail in conjunction with the accompanying drawings. However, the present disclosure is not limited to the following embodiments, but may be implemented in various different forms, and merely the present embodiments are provided to complete the present disclosure and to fully inform those of ordinary skill in the art to which the present disclosure pertains to the scope of the disclosure, the present disclosure is merely defined by the scope of the claims.

Hereinafter, the example embodiments of the present disclosure will be described in detail with reference to the accompanying drawings.

FIG. 1 is a conceptual diagram for explaining various types of waveguides of an antenna apparatus according to example embodiments of the present disclosure.

Referring to FIG. 1, an antenna apparatus according to the example embodiments of the present disclosure may include a hollow pillar shaped waveguide 110 extending in a first direction, and the waveguide 110 may have various shapes. In this case, FIG. 1 shows a cross-section of the waveguide 110 cut in a plane perpendicular to the first direction. For example, the waveguide 110 may have a hollow polygonal column or a hollow cylindrical shape.

According to the example embodiments, the waveguide 110 may be provided as a plurality of waveguides 110. In this case, the plurality of waveguides 110 may be arranged in an array form having a constant interval (that is, designed as an array). The distance between the plurality of waveguides 110 arranged in an array form may be, for example, less than half the wavelength of the electromagnetic wave transmitted by the antenna apparatus.

Also, the antenna apparatus according to the example embodiments of the present disclosure may further include at least one ridge 120 protruding from the inner circumferential surface 111 (or inner wall) of the waveguide 110. The ridge 120 may extend in the first direction along the inner circumferential surface 111 of the waveguide 110. The ridge 120 may have a rectangular cross-section in view of the cross-sectional area according to FIG. 1.

According to the example embodiments, the ridge 120 may be provided as a plurality of ridges 120. In this case, the length in the radial direction of each of the ridges 120 (that is, the direction from the inner circumferential surface 111 of the waveguide 110 toward the central axis of the waveguide 110) may be substantially the same. For example, when the antenna apparatus includes two ridges 120, the two ridges 120 may be provided to face each other. Also, for example, when the antenna apparatus includes three ridges 120, the three ridges 120 may be provided to form an angle of about 120 degrees to each other. Also, for example, when the antenna apparatus includes four ridges 120, the four ridges 120 may be provided to form about 90 degrees to each other. In this case, each of the ridges 120 may face the other one of the ridges 120.

According to the example embodiments, the antenna apparatus according to the example embodiments of the present disclosure extends from one end of the waveguide 110 in the first direction, and it may further include a horn portion (that is, having a cone shape) having a radius increasing in the first direction. That is, the antenna apparatus according to the example embodiments of the present disclosure may be a ridged horn antenna.

Figure 2:
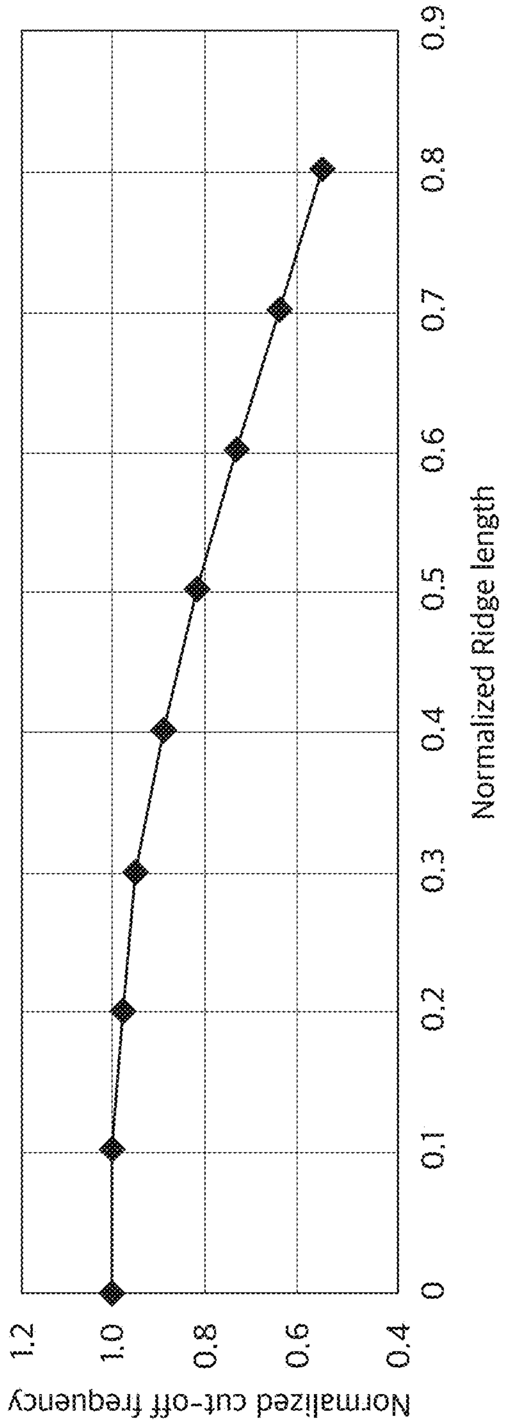
FIG. 2 is a graph for explaining a change in cut-off frequency according to a length of a ridge of an antenna apparatus according to example embodiments of the present disclosure.

FIG. 2 is a graph for explaining a change in cut-off frequency according to a length of a ridge of an antenna apparatus according to example embodiments of the present disclosure.

In this case, the horizontal axis represents the ratio of the length of the ridge in the radial direction to the radius of the waveguide of the antenna apparatus (that is, the normalized ridge length), and the vertical axis represents the ratio of the cut-off frequency of the fundamental mode of the antenna apparatus including the ridge to the cut-off frequency of the antenna apparatus without the ridge (that is, the normalized cut-off frequency).

FIG. 2 is a measurement for an antenna apparatus including four ridges and a hollow cylindrical waveguide. In this case, the length of each of the ridges in the circumferential direction of the waveguide (that is, the direction rotating along the outer circumferential or inner circumferential surface of the waveguide on a plane intersecting the first direction) may be about 0.1 times the radius of the waveguide.

Referring to FIG. 2, as the length of the ridge in the radial direction increases, the cut-off frequency may decrease. For example, when the normalized ridge length is from about 0.7 to about 0.8 (that is, the length in the radial direction of the ridge is from about 0.7 to about 0.8 times the radius of the waveguide), the normalized cut-off frequency may be from about 0.5 to 0.7. Accordingly, as the length of the ridge in the radial direction increases, the antenna apparatus may be easily miniaturized. Accordingly, the miniaturized antenna apparatus may easily suppress unwanted grating lobe during beam steering.

Figure 3A:
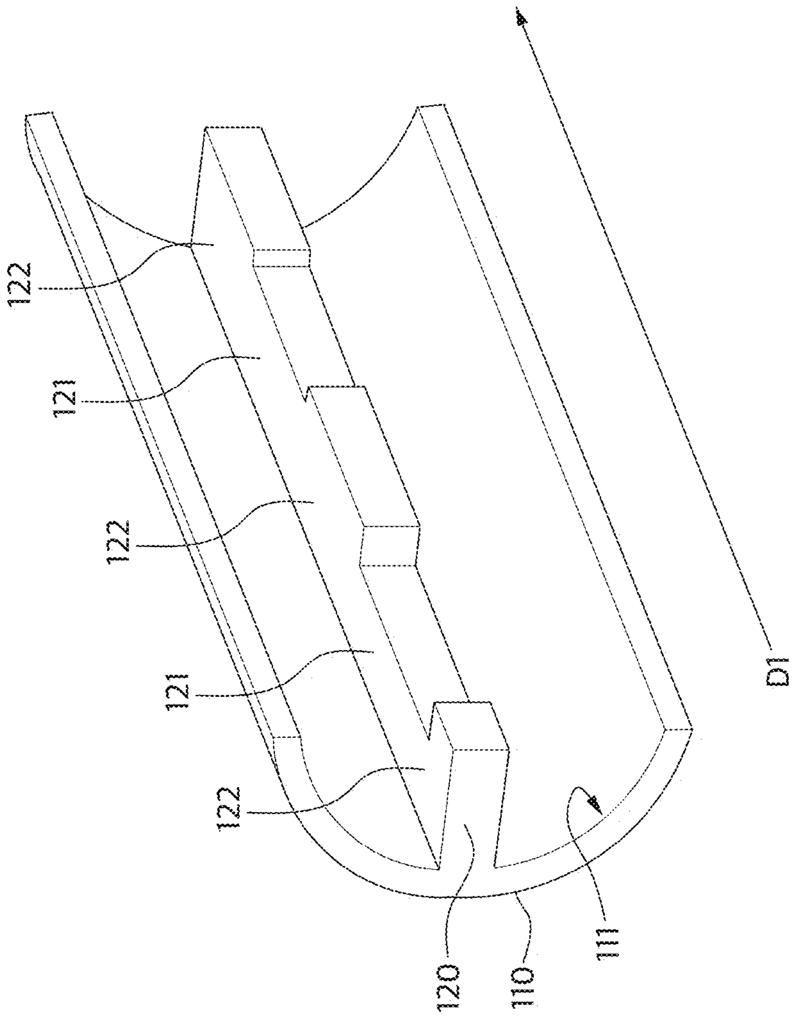
FIG. 3A, FIG. 3B, FIG. 4A, FIG. 4B, FIG. 5A, and FIG. 5B are cross-sectional perspective views illustrating an antenna apparatus according to example embodiments of the present disclosure.
Figure 3B:
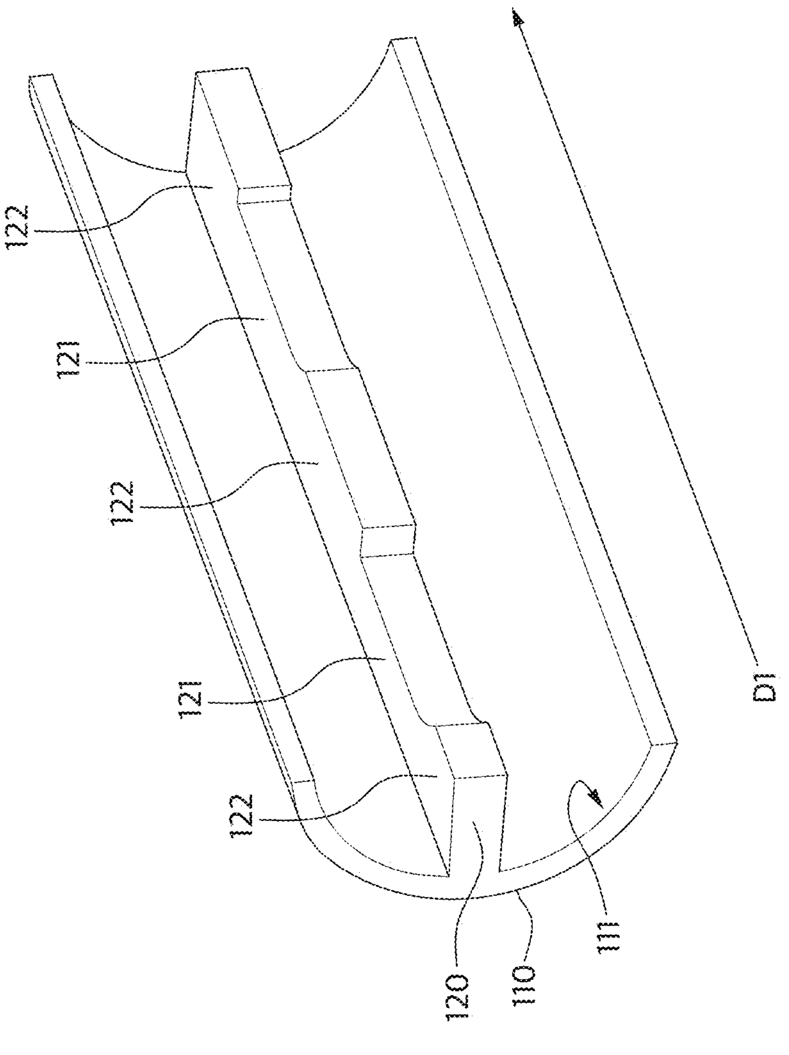

FIG. 3A and FIG. 3B are cross-sectional perspective views illustrating an antenna apparatus according to example embodiments of the present disclosure.

Referring to FIGS. 3*a* and 3*b*, the antenna apparatus according to the example embodiments of the present disclosure may include a hollow pillar shaped waveguide 110 extending in a first direction D1, and the ridge 120 protrudes from the inner circumferential surface 111 of the waveguide 110 in the radial direction of the waveguide 110 and extends in the first direction D1. In this case, the ridge 120 may have at least one recessed groove formed in the first direction D1. The recessed groove may be a structure in which a surface in a direction toward the central axis of the waveguide 110 is concavely recessed as a part of the ridge 120. According to the example embodiments, the recessed groove may be referred to as one of a recessed portion of the ridge 120, and a concave portion of the ridge 120.

The ridge 120 may include a first portion 121 having an recessed groove and a second portion 122 at one side of the first portion 121. A length of the first portion 121 in the radial direction may be smaller than a length of the second portion 122 in the radial direction. For example, the length of the second portion 122 in the radial direction may be about 0.6 times to about 0.9 times the radius of the waveguide 110, and the length of the first portion 121 in the radial direction may be smaller than the length of the second portion 122 in the radial direction by about 0.05 times to about 0.3 times the radius of the waveguide 110.

According to the example embodiments, the first portions 121 having an recessed groove may be provided as a plurality of first portions 121. The first portions 121 may be spaced apart from each other in the first direction D1. The lengths of each of the first portions 121 in the radial direction may be different from each other. According to the example embodiments, the length of the first portions 121 in the radial direction may increase in the first direction D1. The length in the radial direction of each of the first portions 121 may be, for example, about 0.3 times to about 0.85 times the radius of the waveguide 110. The lengths of the first portions 121 in the first direction D1 may be different from each other. According to the example embodiments, the length of the first portions 121 in the first direction D1 may decrease in the first direction D1. A length of each of the first portions 121 in the first direction D1 may be, for example, about 1.1 times to about 1.8 times the radius of the waveguide 110.

The antenna apparatus according to the example embodiments of the present disclosure may be manufactured using, for example, a 3D printing method. More specifically, the antenna apparatus according to the example embodiments of the present disclosure may be manufactured using an additive manufacturing method. In this case, the direction of the additive manufacturing may be, for example, a direction opposite to the first direction D1. Accordingly, referring to FIG. 3B, at least a portion of a surface of each of the first portions 121 of the ridge 120 in a direction toward the central axis of the waveguide 110 may have a curved shape. In other words, at least one portion of each of the first portions 121 of the ridge 120 may be a portion whose length in the radial direction increases as a distance from the second portion 122 decreases (that is, decreases in the first direction D1). A portion of the ridge 120 whose length in the radial direction is changed may support the structures inside the waveguide 110 during the additive manufacturing process, and thus the manufacture of the antenna apparatus according to the example embodiments of the present disclosure may be facilitated.

Figure 4A:
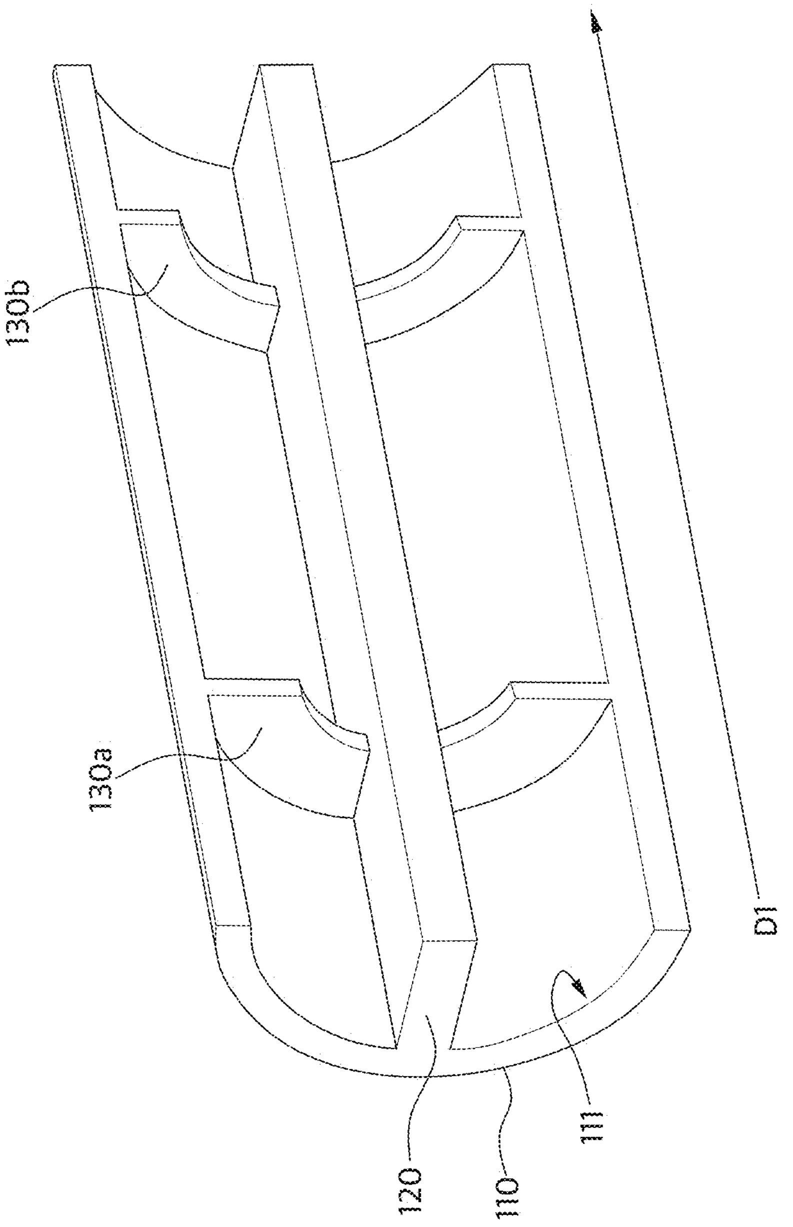
Figure 4B:
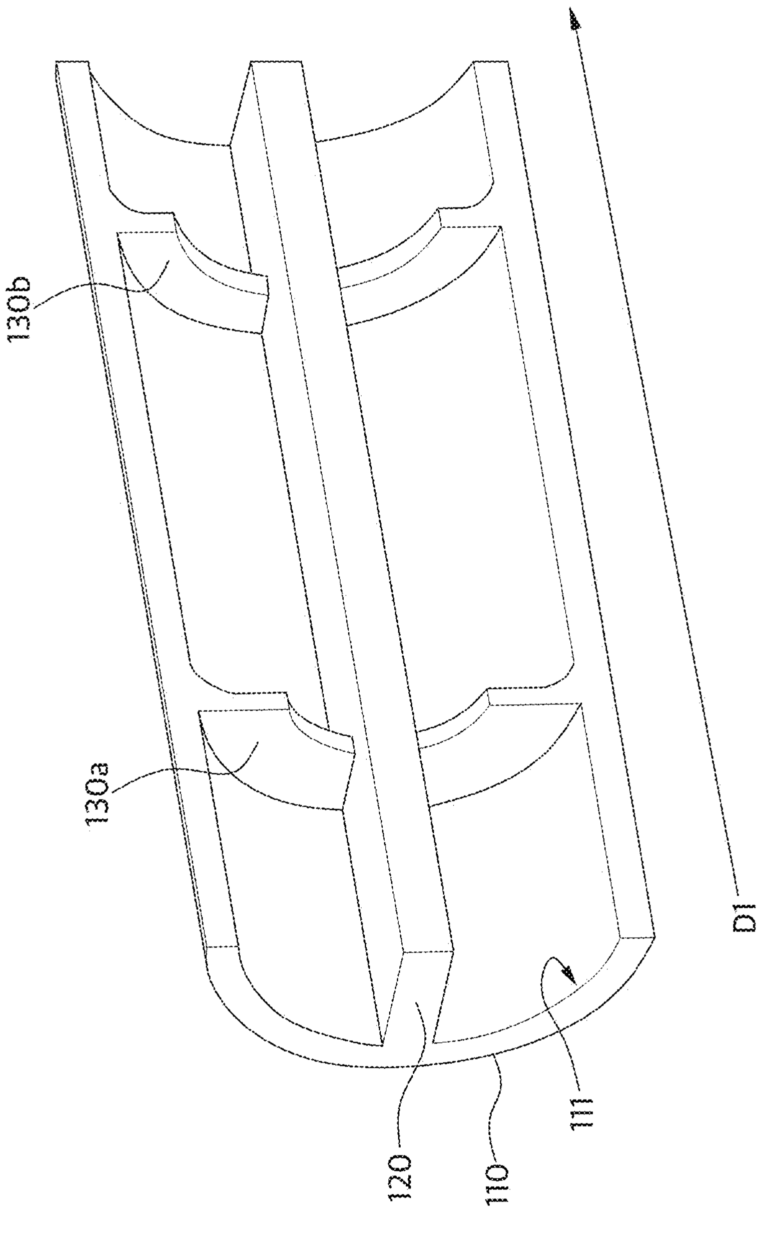

FIG. 4A and FIG. 4B are cross-sectional perspective views for explaining an antenna apparatus according to the example embodiments of the present disclosure. Hereinafter, for convenience of description, descriptions of the items substantially the same as those described with reference to FIG. 3A and FIG. 3B will be omitted and differences will be described in detail.

Referring to FIG. 4A and FIG. 4B, the antenna apparatus according to the example embodiments of the present disclosure may include the hollow pillar shaped waveguide 110 extending in the first direction D1, the ridge 120 protruding from the inner circumferential surface 111 of the waveguide 110 in the radial direction of the waveguide 110 and extending in the first direction D1 and the iris structures 130*a* and 130*b* protruding from the inner circumferential surface 111 of the waveguide 110 along a plane intersecting the first direction D1.

Each of the iris structures 130*a* and 130*b* may have, for example, a ring shape extending along the inner circumferential surface 111 of the waveguide 110. The iris structures 130*a* and 130*b* may include a first iris structure 130*a* and a second iris structure 130*b*. The first iris structure 130*a* and the second iris structure 130*b* may be spaced apart from each other in the first direction D1.

The length of each of the first iris structure 130*a* and the second iris structure 130*b* in the radial direction may be smaller than the length of the ridge 120 in the radial direction. For example, the length of the ridge 120 in the radial direction may be about 0.6 times to about 0.9 times the radius of the waveguide 110, and the length of each of the first iris structure 130*a* and the second iris structure 130*b* in the radial direction may be about 0.2 times to about 0.6 times the radius of the waveguide 110.

The first iris structure 130*a* and the second iris structure 130*b* may have different lengths in the radial direction. For example, the length of the first iris structure 130*a* in the radial direction may be greater than the length of the second iris structure 130*b* in the radial direction. According to the example embodiments, the lengths of the iris structures 130*a* and 130*b* in the radial direction may decrease in the first direction D1. Also, according to the example embodiments, the lengths of the first iris structure 130*a* and the second iris structure 130*b* in the first direction D1 may be different from each other.

An antenna apparatus according to the example embodiments of the present disclosure may be manufactured using an additive manufacturing method. In this case, the direction of the additive manufacturing may be, for example, a direction opposite to the first direction D1. Accordingly, referring to FIG. 4B, at least a portion of each of the iris structures 130*a* and 130*b* may have the length in the radial direction, and the length may decrease in the first direction D1. A portion of the iris structures 130*a* and 130*b* having varying lengths in the radial direction may support the structures inside the waveguide 110 during the additive manufacturing process, and accordingly, manufacturing an antenna apparatus according to the example embodiments of the present disclosure may be facilitated.

Figure 5A:
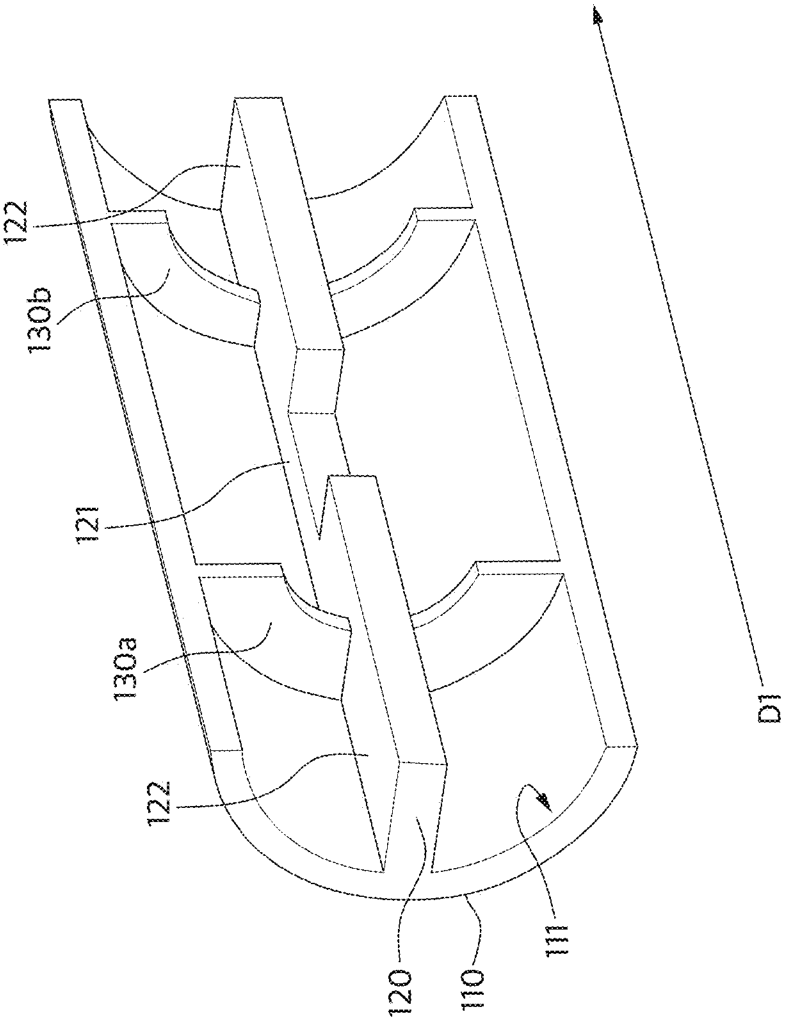
Figure 5B:
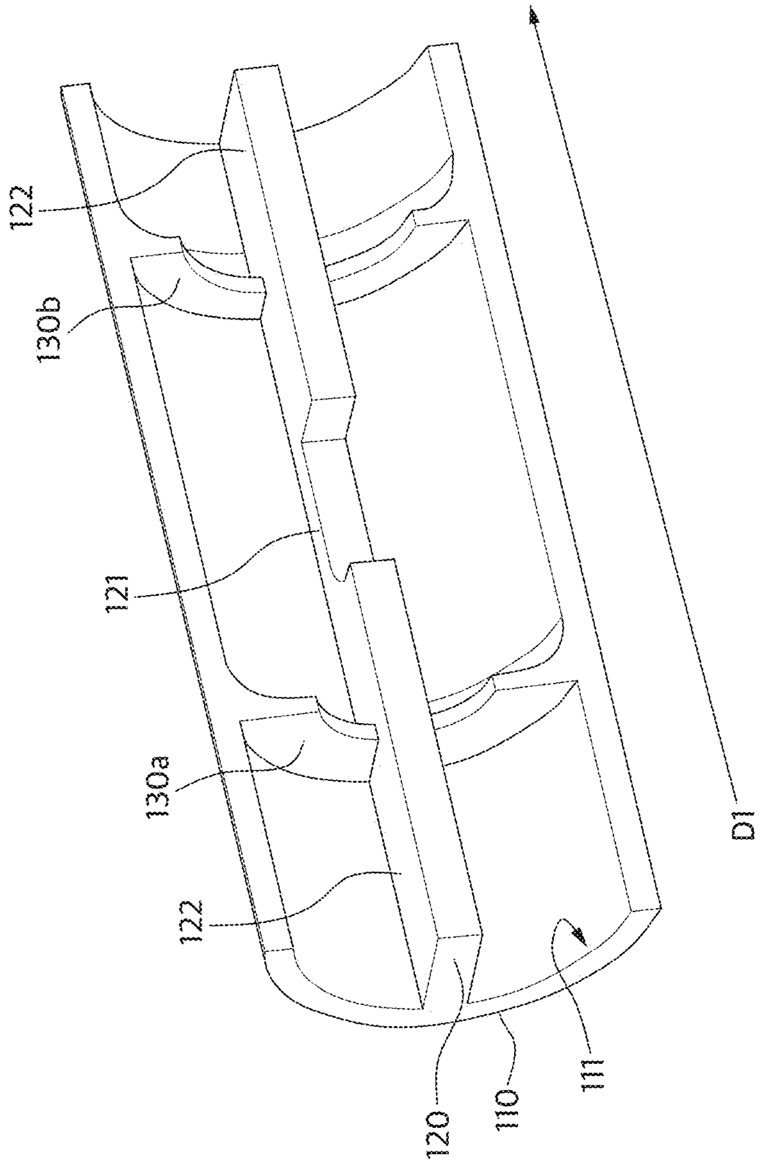

FIG. 5A and FIG. 5B are cross-sectional perspective views for explaining an antenna apparatus according to the example embodiments of the present disclosure. Hereinafter, for convenience of description, descriptions of items substantially the same as those described with reference to FIG. 3A, FIG. 3B, FIG. 4A and FIG. 4B will be omitted and differences will be described in detail.

Referring to FIG. 5A and FIG. 5B, the antenna apparatus according to the example embodiments of the present disclosure may include the hollow pillar shaped waveguide 110 extending in the first direction D1, the ridge 120 protruding from the inner circumferential surface 111 of the waveguide 110 in the radial direction of the waveguide 110 and extending in the first direction D1 and the iris structures 130*a* and 130*b* protruding from the inner circumferential surface 111 of the waveguide 110 along a plane intersecting the first direction D1. In this case, the ridge 120 may have at least one recessed groove formed in the first direction D1. The recessed groove may be a structure in which a surface in a direction toward the central axis of the waveguide 110 is concavely recessed as a part of the ridge 120.

The ridge 120 may include a first portion 121 having an recessed groove and a second portion 122 at one side of the first portion 121. The iris structures 130*a* and 130*b* may include a first iris structure 130*a* and a second iris structure 130*b*. The first iris structure 130*a* and the second iris structure 130*b* may be spaced apart from each other in the first direction D1. Each of the first iris structure 130*a* and the second iris structure 130*b* may extend from a side surface of the second portion 122 of the ridge 120 in the circumferential direction of the waveguide 110. The first portion 121 of the ridge 120 may be provided between the first iris structure 130*a* and the second iris structure 130*b*, and may be spaced apart from each of the first iris structure 130*a* and the second iris structure 130*b* in the first direction D1.

A length of the first portion 121 of the ridge 120 in the radial direction may be smaller than a length of the second portion 122 of the ridge 120 in the radial direction. As an example, the length of the first portion 121 of the ridge 120 in the radial direction may be smaller than the length of each of the first iris structure 130*a* and the second iris structure 130*b* in the radial direction. As another example, the length of the first portion 121 of the ridge 120 in the radial direction may be smaller than the length of the first iris structure 130*a* in the radial direction and greater than the length of the second iris structure 130*b* in the radial direction. As another example, the length of the first portion 121 of the ridge 120 in the radial direction may be greater than the length of each of the first iris structure 130*a* and the second iris structure 130*b* in the radial direction.

An antenna apparatus according to the example embodiments of the present disclosure may be manufactured using an additive manufacturing method. In this case, the direction of the additive manufacturing may be, for example, a direction opposite to the first direction D1. Accordingly, referring to FIG. 5B, at least a portion of the surface of the first portion 121 of the ridge 120 in the direction toward the central axis of the waveguide 110 may have a curved shape. In other words, at least one portion of the first portion 121 of the ridge 120 may be a portion in which the length in the radial direction increases as a distance from the second portion 122 decreases (that is, decreasing in the first direction D1). In addition, at least a portion of each of the iris structures 130*a* and 130*b* may have a length in the radial direction that decreases in the first direction D1.

Figure 6A:
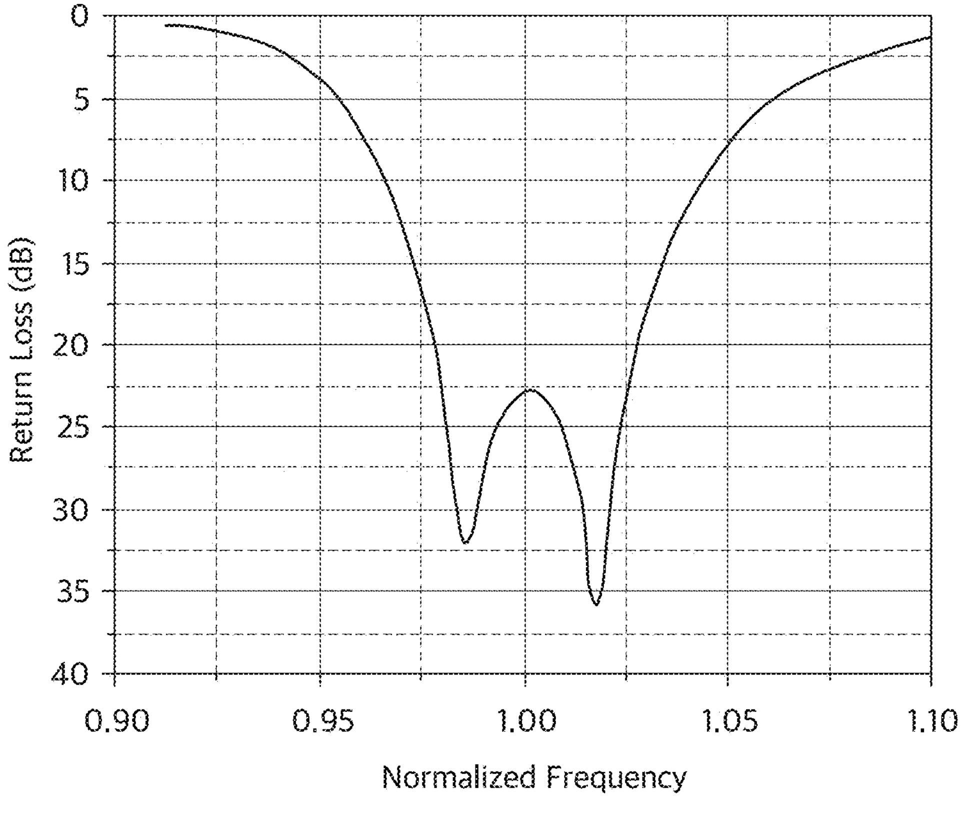
FIG. 6A and FIG. 6B are graphs for explaining a change in return loss according to a frequency of an antenna apparatus according to example embodiments of the present disclosure.
Figure 6B:
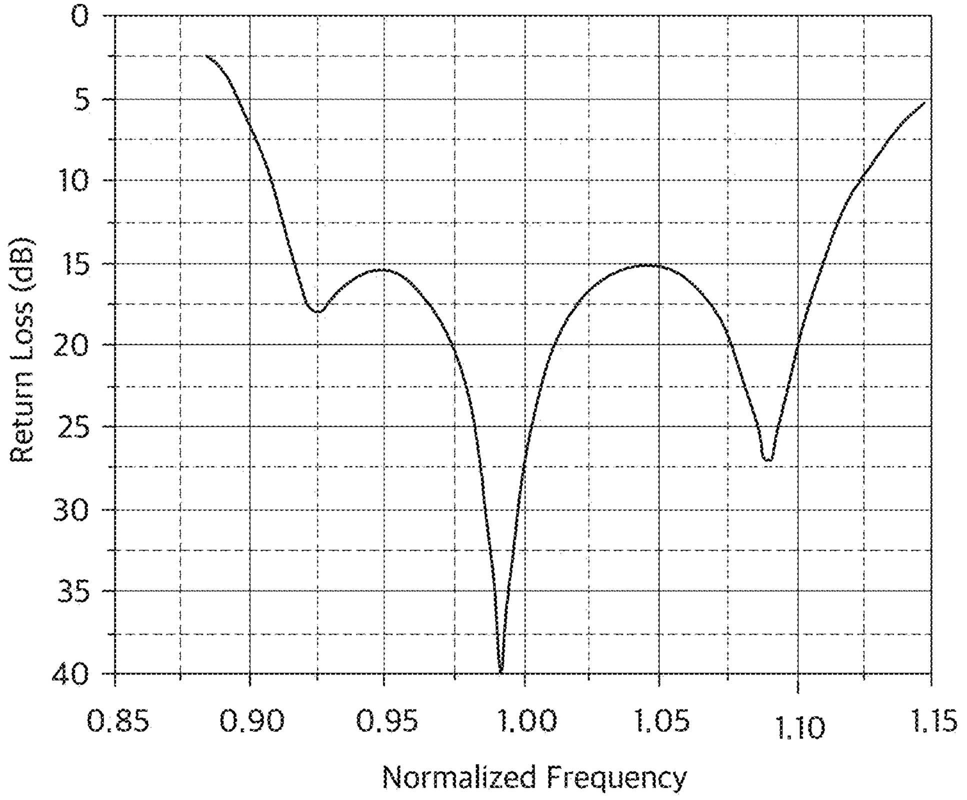

FIG. 6A and FIG. 6B are graphs for explaining a change in return loss according to a frequency of an antenna apparatus according to the example embodiments of the present disclosure.

In this case, the horizontal axis represents the ratio of the measurement frequency to the sampling frequency (that is, normalized frequency), and the vertical axis represents the return loss. The unit of return loss is decibel (dB).

FIG. 6A is a case in which the sum of the number of recessed grooves described with reference to FIG. 3A and FIG. 3B and the number of iris structures described with reference to FIGS. 4A and 4*b* is two (that is, a two-stage impedance matching structure), and FIG. 6B is a case in which the sum of the number of recessed grooves and the number of iris structures is three (that is, a three-stage impedance matching structure) as described with reference to FIG. 5A and FIG. 5B.

Referring to FIGS. 6A and 6B, in the case of the two-stage impedance matching structure, the graph has two peaks, and in the case of the three-stage impedance matching structure, the graph has three peaks. Accordingly, the bandwidth of the three-stage impedance matching structure (about 20%) may be greater than that of the two-stage impedance matching structure (about 8%) based on the return loss of about 15 dB. In other words, as the number (that is, the singular number) of the impedance matching structures increases, the return loss of the antenna apparatus according to an example embodiment of the present disclosure may decrease, and thus the bandwidth may increase.

Accordingly, the antenna apparatus according to the example embodiments of the present disclosure may transmit high output power as well as have broadband characteristics due to an increase in the number of impedance matching structures so that it may be used for an array antenna apparatus for communication of military satellites or an antenna apparatus for a radar/electronic warfare system. Military satellites including an antenna apparatus according to the example embodiments of the present disclosure may increase their transmission capacity through frequency band expansion and application of a higher-order modulation scheme, and thus may maintain excellent communication quality even in a poor radio wave environment, and monitoring and reconnaissance, command and control, exchange of information between precision strike systems, and command and control between tactical maneuvers may be ensured.

Figure 7A:
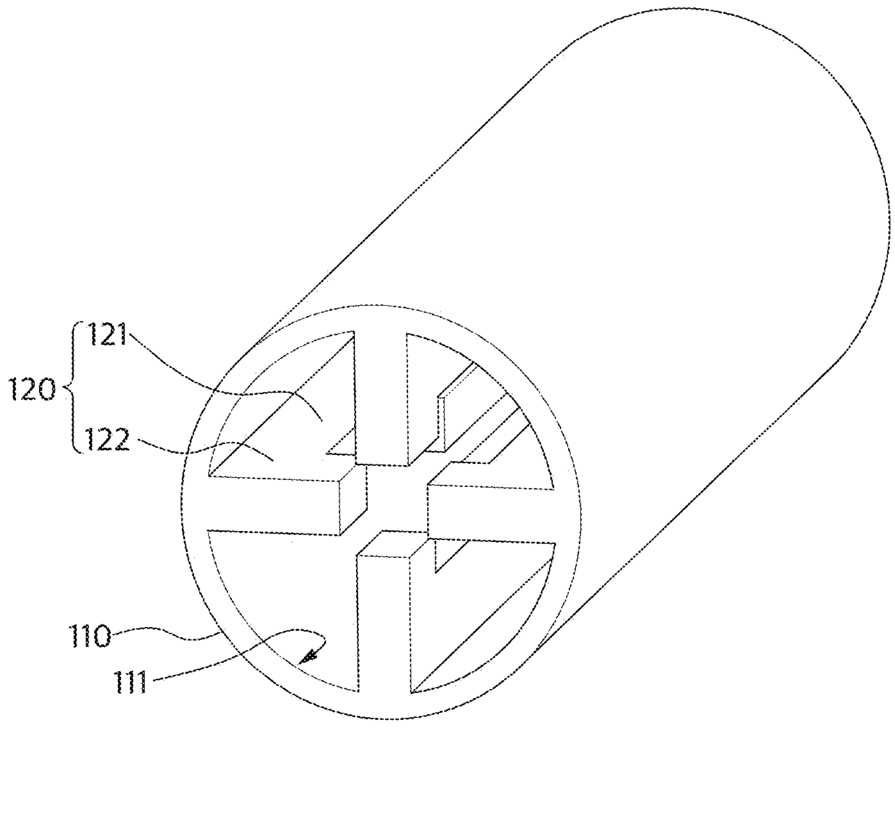
FIG. 7A, FIG. 7B, and FIG. 7C are perspective views for explaining a cross-section of a waveguide of an antenna apparatus according to embodiments of the present disclosure.
Figure 7B:
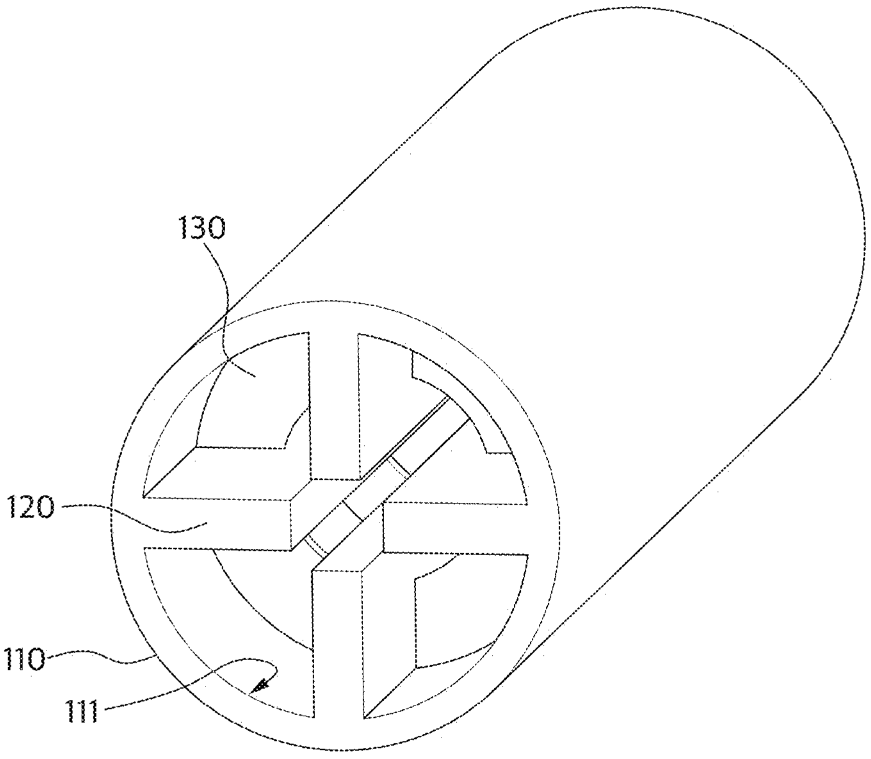
Figure 7C:
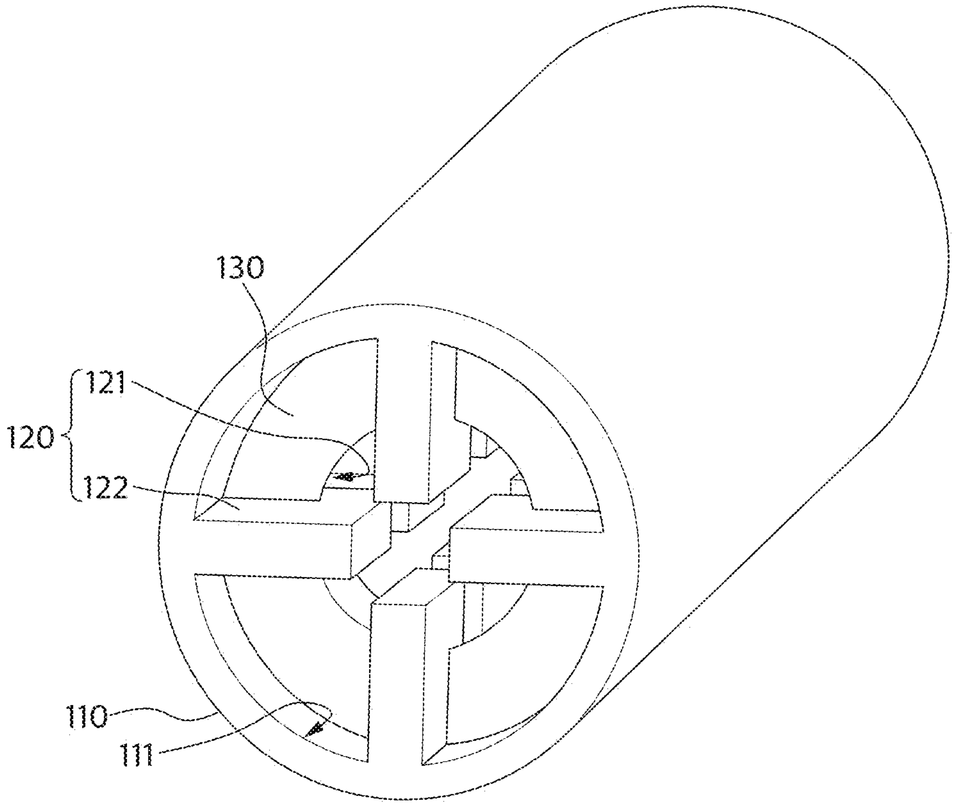

FIG. 7A, FIG. 7B, and FIG. 7C are perspective views for explaining a cross-section of a waveguide of an antenna apparatus according to the example embodiments of the present disclosure. Hereinafter, for convenience of description, descriptions of items substantially the same as those described with reference to FIG. 3A, FIG. 3B, FIG. 4A, FIG. 4B, FIG. 5A and FIG. 5B will be omitted and differences will be described in detail.

Referring to FIGS. 7A, 7B, and 7C, an antenna apparatus including a waveguide 110 extending in a first direction and four ridges 120 protruding from an inner circumferential surface 111 of the waveguide 110 in a radial direction of the waveguide 110 is shown. In this case, each of the ridges 120 may have at least one recessed groove formed in the first direction D1. In other words, each of the ridges 120 may include a first portion 121 having an recessed groove and a second portion 122 at one side of the first portion 121. In this case, the recessed groove of each of the ridges 120 may be provided symmetrically with respect to the central axis of the waveguide 110. In other words, the first portion 121 of any one of the ridges 120 may face the first portion 121 of the other one of the ridges 120 facing any one of the ridges 120. The antenna apparatus may further include an iris structure 130 protruding from the inner circumferential surface 111 of the waveguide 110 along a plane intersecting the first direction D1. Each of the recessed groove and the iris structure 130 may serve as an inductor or a capacitor in a circuit, and thus an impedance mismatch matter caused by miniaturization of the antenna apparatus may be solved.

As specific examples described in the present example embodiment, the technical scope is not limited in any way. For brevity of the specification, descriptions of other functional aspects of antenna-related components may be omitted. In addition, the connections or connecting members of the lines between the components shown in the drawings exemplarily represent functional connections and/or physical or circuit connections, and in an actual apparatus, it may be represented as a variety of alternative or additional functional connections, physical connections, or circuit connections.

It will be apparent to those skilled in the art that various modifications and variations can be made in the antenna apparatus of the present disclosure without departing from the spirit or scope of the invention. Thus, it is intended that the present disclosure cover the modifications and variations of this invention provided they come within the scope of the appended claims and their equivalents.

What is claimed is:

1. An antenna apparatus, comprising:

a hollow pillar shaped waveguide extending in a first direction;

at least one ridge protruding from an inner circumferential surface of the waveguide and extending in the first direction; and an iris structure protruding from the inner circumferential surface of the waveguide along a plane intersecting the first direction, wherein the ridge has at least one recessed groove formed in the first direction, wherein the ridge comprises a first portion having the recessed groove and a plurality of second portions that are connected to both sides of the first portion and are not recessed, wherein the degree of protrusion of the recessed groove of the first portion from the inner circumferential surface of the waveguide is maintained uniformly, wherein a length in a radial direction of the waveguide of the first portion is less than a length in a radial direction of each of the second portion.

2. The antenna apparatus of claim 1, wherein the ridge is provided as a plurality of ridges.

3. The antenna apparatus of claim 1, wherein at least a portion of the first portion has a length in a radial direction, the length decreasing in the first direction.

4. The antenna apparatus of claim 1, wherein the ridge has a plurality of first portions, each having the recessed groove.

5. The antenna apparatus of claim 4, wherein the plurality of first portions has different lengths in a radial direction of the waveguide.

6. The antenna apparatus of claim 4, wherein the plurality of first portions has different lengths in the first direction.

7. The antenna apparatus of claim 1, wherein a length of the iris structure in a radial direction of the waveguide is less than a length of the ridge in the radial direction.

8. The antenna apparatus of claim 1, wherein at least a portion of the iris structure has a length in a radial direction of the waveguide, the length decreasing in the first direction.

9. The antenna apparatus of claim 1, wherein the iris structure is provided as a plurality of iris structures.

10. The antenna apparatus of claim 9, wherein the plurality of iris structures has different lengths in a radial direction of the waveguide.

11. The antenna apparatus of claim 9, wherein the plurality of iris structures has different lengths in the first direction.

12. An antenna apparatus, comprising:

a hollow pillar shaped waveguide extending in a first direction;

at least one ridge protruding from an inner circumferential surface of the waveguide and extending in the first direction, the at least one ridge comprising a first portion having the recessed groove and a plurality of second portions that are connected to both sides of the first portion and are not recessed; and an iris structure protruding from the inner circumferential surface of the waveguide along a plane intersecting the first direction, wherein the degree of protrusion of the recessed groove of the first portion from the inner circumferential surface of the waveguide is maintained uniformly.

13. The antenna apparatus of claim 12, wherein a length of the iris structure in a radial direction of the waveguide is less than a length of the ridge in the radial direction, and at least a portion of the iris structure has a length in the radial direction, the length decreasing in the first direction.

* * * * *